United States Patent Office 3,563,725
Patented Feb. 16, 1971

3,563,725
2-ARYLTHIODI- AND TETRAHYDROTHIOPHENE 1,1-DIOXIDES AS HERBICIDES
Douglas I. Relyea, Pompton Plains, and Richard J. Sperley, Wayne, N.J., and Ronald B. Ames, Naugatuck, Conn., assignors to Uniroyal, Inc., New York, N.Y., a corporation of New Jersey
No Drawing. Filed Oct. 30, 1967, Ser. No. 679,150
Int. Cl. A01n 9/14; C07d 63/04, 63/08
U.S. Cl. 71—91                        1 Claim

ABSTRACT OF THE DISCLOSURE

Preemergent herbicides of the general formula:

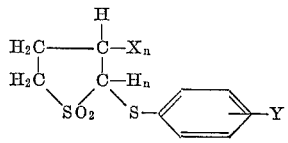

wherein X is chlorine or bromine, Y is hydrogen or an alkyl radical having 1 to 8 carbon atoms; and $n$ is 0 or 1, provided that where $n$ is 0, the bond requirements of the 2 and 3 carbon atoms of the thiophene ring structure are satisfied by a double bond between them, and where $n$ is 1, X and Y are trans to each other, are applied to the locus of weed seeds to prevent weed growth.

---

This invention relates to 2-arylthio-4,5-dihydrothiophene 1,1-dioxides, their method of preparation, and the use of the aforesaid compounds and 2-arylthio-3-halotetrahydrothiophene 1,1-dioxides as a preemergent herbicide.

The new chemicals of the invention may be represented by the formula:

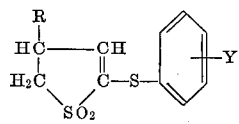

wherein R is either hydrogen, chlorine, or methyl; and Y is hydrogen, an alkyl having 1 to 8 carbon atoms, chlorine or bromine. Examples of these compounds are 2-phenylthio 4,5-dihydrothiophene 1,1-dioxide; 2-(p-bromophenylthio)-4,5-dihydrothiophene 1,1-dioxide; and 2-(o-tolylthio)-4,5-dihydrothiophene 1,1-dioxide.

These 2-arylthio-4,5-dihydrothiophene 1,1-dioxides are prepared, in accordance with the invention, by the dehydrohalogenation of 2-arylthio-3-halotetrahydrothiophene 1,1-dioxide in a solution of a tertiary amine at a temperature from 5° to 100° C., preferably 20 to 40° C. While other basic materials may be employed for this reaction, such as caustic, poorer yields of the desired product are obtained. Examples of the tertiary amines are those having from 4 to 12 carbon atoms such as pyridine, dimethylaniline, and triethylamine.

The 2-arylthio-3-halotetrahydrothiophene 1,1-dioxide have the formula:

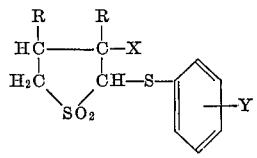

wherein Y and R are as previously defined, but only one R is chlorine; and X is chlorine or bromine. Such compounds may be prepared by the process described in copending U.S. patent application Ser. No. 573,478, filed Aug. 19, 1966 now abandoned. Examples of these compounds are 2-(phenylthio)-3-chlorotetrahydrothiophene-1,1-dioxide; 2-(p-bromophenylthio)-3-chlorotetrahydrothiophene-1,1-dioxide; and 2-(p-tolylthio)-3-chlorotetrahydrothiophene-1,1-dioxide.

The chemicals of the present invention may be applied to soil at, before or after crop emergence and before weed emergence. The chemicals may be applied to soil in various forms as explained below.

The chemical may be impregnated on granular organic and inorganic carriers such as corn cobs, activated carbon, attapulgite clay, mica and other types of granular carriers known in the art. They may also be pelletized as described by Gallaway Pat. No. 3,056,723 or by Polon Pat. No. 3,192,290. If desired, the chemicals may be mixed with a powdered solid carrier, together with a surface active dispersing agent, so that a wettable powder may be obtained which may be applied directly, or which may be shaken up with water to make an aqueous dispersion for application in that form. The chemicals may be dissolved in a solvent such as acetone, benzene or other aliphatic and aromatic hydrocarbons, and the solution of the chemical dispersed in water with the aid of a surface-active dispersing agent to give a sprayable aqueous dispersion. Such surface-active dispersing agents may be anionic, nonionic or cationic surface-active agents. Such surface-active agents are well known and reference is made to Hoffman et al., U.S. Pat. No. 2,614,-916, columns 2 to 4, for detailed examples of the same.

The chemicals, in the forms listed above, may be applied (1) to the soil surface, (2) to soil surface and incorporated to a depth of ½–2″, and (3) sub-surface to a depth of ½″–2″ by a soil injector known in the art of applying herbicides.

The chemical may be applied to the soil at rates of 1 to 20 pounds per acre.

To illustrate more fully the instant invention attention is directed to the following examples:

EXAMPLE I

Preparation of 2-phenylthio-4,5-dihydrothiophene 1,1-dioxide

A solution of 11.66 g. of 2-(phenylthio)-3-chlorotetrahydrothiophene 1,1-dioxide in 25 ml. of dry pyridine was stirred sixteen hours at 25° C. Dilution with ethyl ether and filtration gave 4.82 g. (94%) of pyridine hydrochloride. The filtrate was evaporated to remove pyridine and recrystallized from ethanol to give 8.6 g. (86%) of 2-phenylthio-4,5-dihydrothiophene 1,1-dioxide, M.P. 63–65°.

*Analysis.*—Calcd. for $C_{10}H_{10}O_2S_2$ (percent): C, 53.07; H, 4.45; S, 28.34. Found (percent): C, 52.03; H, 4.57; S, 28.00.

EXAMPLE II

Eighty milligrams of chemical were dissolved in 5 milliliters acetone and 30 milligrams isooctyl phenyl polyethoxy ethanol. This preparation was made up to 160 milliliters with distilled water and blended, giving a 500 p.p.m. solution. Eighty milliliters of 500 p.p.m. solution were drenched on a 150 mm. pot which contained a mixture of four broadleaf weeds, namely: Pigweed—*Amaranthus retroflexus*, purslane—*Portulaca oleracea,* lamb's-quarters—*Chenapodium album,* and oxeye daisy—*Chrysanthemum leucanthemum.* Also in the pot were three grass species, namely: Crabgrass—*Digitaria sanguinalis,* barnyard grass—*Echinochloa crusgalli* and giant foxtail—*Setaria faberii.* The remaining 80 milliliters were used for an additional replication. Eighty milliliters of this 500 p.p.m. solution drenched on the surface of a 150 mm. pot is equivalent to 20 #/acre. Pots were subirrigated and scored 14 days later. Results are given in Table 1.

TABLE 1

| Thiophene 1,1-dioxide | Application rate, lbs./acre | Percent control | |
|---|---|---|---|
| | | Broadleaf | Grass |
| Trans-2-phenylthio-3-chlorotetrahydro.. | 20 | 100 | 97 |
| 2-phenylthio-4,5-dihydro.. | 20 | 100 | 100 |
| Trans-2-(2-methylphenylthio)-3-chlorotetrahydro.. | 20 | 100 | 100 |
| Trans-2-(4-bromophenylthio)-3-chlorotetrahydro.. | 20 | 100 | 12 |
| 3-phenylthio-2,3-dihydro.. | 20 | 0 | 0 |
| Trans-3-phenylthio-4-chlorotetrahydro.. | 20 | 30 | 0 |

The above data clearly show the effectiveness of the compounds of the invention as pre-emergent herbicides. The next-to-last and the last runs illustrate the ineffectiveness of isomeric compounds. The next to last compound is described in Gundermann et al., Angew Chem. Ind. Ed. Engl., 5, 668 (July 1966).

EXAMPLE III

To establish the activity of the compounds of the invention at lower application rates, the procedure described in Example II was repeated except the solution was diluted to give concentrations equivalent to 10 and 5 pounds per acre. The results are set forth in Table 2:

TABLE 2

| Thiophene 1,1-dioxide | Application rate, lbs./acre | Percent control | |
|---|---|---|---|
| | | Broadleaf | Grass |
| Trans-2-phenylthio-3-chlorotetrahydro... | 10 | 99 | 85 |
| | 5 | 65 | 20 |
| 2-phenylthio-4,5-dihydro.. | 10 | 100 | 96.5 |
| | 5 | 85 | 75 |
| Trans-2-(2-methylphenylthio)-3-chlorotetrahydro.. | 10 | 82.5 | 0 |
| | 5 | 75.5 | 0 |

The above data illustrates that activity at lower application rates continues with respect to the broadleaf species. The preferred compounds also maintain activity with respect to the grass species.

Having thus described our invention, what we claim and desire to protect by Letters Patent is:

1. A method of destroying weeds prior to their emergence from the soil which comprises applying to the locus of the weed seeds a herbicidally effective amount of trans-2-(4 - bromophenylthio) - 3 - chlorotetrahydrothiophene 1,1-dioxide.

References Cited

UNITED STATES PATENTS

| | | | |
|---|---|---|---|
| 2,393,925 | 1/1946 | Morris et al. | 424—187 |
| 2,495,467 | 1/1950 | Morris et al. | 260—332.1 |
| 2,898,205 | 8/1959 | Pyne et al. | 71—91 |
| 2,939,871 | 6/1960 | Pyne et al. | 260—332.5 |
| 3,044,865 | 7/1962 | Rosen | 71—91 |
| 3,073,692 | 1/1963 | Berkey | 71—91 |
| 3,231,585 | 1/1966 | Reifschneider | 260—329 |

FOREIGN PATENTS

| | | | |
|---|---|---|---|
| 6614624 | 4/1967 | Netherlands | 71—91 |

OTHER REFERENCES

Relyea, J. Org. Chem. 31, 3577–3579 (1966).

ELBERT L. ROBERTS, Primary Examiner

M. M. KASSENOFF, Assistant Examiner

U.S. Cl. X.R.

260—332.1